(12) United States Patent
Denne

(10) Patent No.: US 8,402,745 B2
(45) Date of Patent: Mar. 26, 2013

(54) PULSE JET ENGINES

(76) Inventor: William Anthony Denne, Great Shelford (GB)

( * ) Notice: Subject to any disclaimer, the term of this patent is extended or adjusted under 35 U.S.C. 154(b) by 1365 days.

(21) Appl. No.: 11/579,212

(22) PCT Filed: May 3, 2005

(86) PCT No.: PCT/GB2005/001681
§ 371 (c)(1),
(2), (4) Date: Oct. 29, 2007

(87) PCT Pub. No.: WO2005/106234
PCT Pub. Date: Nov. 10, 2005

(65) Prior Publication Data
US 2008/0209884 A1    Sep. 4, 2008

(30) Foreign Application Priority Data

Apr. 30, 2004 (GB) .................................. 0409664.0
Jul. 8, 2004 (GB) .................................. 0415287.2
Jul. 19, 2004 (GB) .................................. 0415972.9

(51) Int. Cl.
*F02K 5/02* (2006.01)
(52) U.S. Cl. ........................................................ 60/247
(58) Field of Classification Search ................. 60/39.38, 60/39.76, 247
See application file for complete search history.

(56) References Cited

U.S. PATENT DOCUMENTS

| | | | |
|---|---|---|---|
| 2,480,540 A * | 8/1949 | Bodine, Jr. ....................... | 60/247 |
| 2,480,626 A * | 8/1949 | Bodine, Jr. ....................... | 60/208 |
| 2,546,966 A * | 4/1951 | Bodine, Jr. ....................... | 60/225 |
| 2,748,753 A * | 6/1956 | Sarrazin et al. .................. | 122/24 |
| 2,796,734 A * | 6/1957 | Bodine, Jr. ....................... | 60/39.77 |
| 2,937,500 A * | 5/1960 | Bodine, Jr. ....................... | 60/39.77 |
| 2,950,592 A * | 8/1960 | Frank ............................... | 60/247 |
| 3,005,310 A | 10/1961 | Reder | |
| 3,332,236 A * | 7/1967 | Kunsagi .......................... | 60/39.39 |
| 3,545,211 A * | 12/1970 | Harp Jr. ........................... | 60/247 |
| 5,016,729 A * | 5/1991 | Linden ............................ | 181/240 |
| 5,090,891 A * | 2/1992 | Hemsath .......................... | 431/1 |
| RE35,172 E * | 3/1996 | Clark ............................... | 60/247 |
| 5,636,511 A * | 6/1997 | Pfefferle et al. ............ | 60/39.822 |
| 7,278,611 B2 * | 10/2007 | Eidelman ...................... | 244/171.1 |
| 7,581,383 B2 * | 9/2009 | Ouellette ......................... | 60/247 |

FOREIGN PATENT DOCUMENTS

| | | |
|---|---|---|
| FR | 2149313 | 3/1973 |
| GB | 2195402 | 4/1988 |
| RU | 2034996 | 5/1995 |
| RU | 2066779 | 9/1996 |
| RU | 2080466 | 5/1997 |

* cited by examiner

*Primary Examiner* — Phutthiwat Wongwian
(74) *Attorney, Agent, or Firm* — Fildes & Outland, P.C.

(57) ABSTRACT

A pulse jet engine comprising a quarter wave gas resonator (1) which is arranged to cycle at an ultrasonic frequency, wherein the resonator (1) is closed, or substantially closed, to gas flow at the pressure antinode (4) thereof. The shape and dimensions of the quarter wave gas resonator (1) at least partially determine the ultrasonic frequency at which the resonator (1) cycles.

38 Claims, 8 Drawing Sheets

PULSE JET ENGINES

TECHNICAL FIELD

This invention relates to pulse jet engines and other aspects thereof.

BACKGROUND OF THE INVENTION

Pulse jet engines of a wide variety of designs have been known for over a century. Generally, they comprise a quarter wave gas resonator into which fuel and air are introduced at the pressure antinode of the resonator during the low pressure phase thereof. Some pulse jet engines include half wave resonators with power output at the pressure node or nodes.

Ignition can be achieved by the mixture of the remaining hot exhaust gases with the incoming fuel and air, so that no other ignition system is required once the engine is running.

Such an engine may be remarkably efficient for such simplicity but the noise level generated by it is totally unacceptable and cannot readily be eliminated. For this reason mainly, pulse jet engines are very seldom used.

Liquid-fuelled pulse jet engines are notoriously difficult to start but once running are extremely efficient.

More recently, there has been interest in the related pulse detonation jet engines in which a fuel/air mixture is burnt in a detonation wave front which leads to higher efficiency. However, these are not true pulse jet engines as the fuel/air mixture is introduced for each pulse which is ignited or detonated separately by a very carefully designed and controlled detonation initiator. There is no quarter wave resonance in a pulse detonation jet engine.

SUMMARY OF THE INVENTION

One object of the present invention is to provide a pulse jet engine which overcomes, or at least substantially reduces, the disadvantages associated with the known jet engines discussed above.

According to one aspect of the present invention, there is provided a pulse jet engine comprising a quarter wave gas resonator which is arranged to cycle at an ultrasonic frequency, wherein the resonator is closed, or substantially closed, to gas flow at the pressure antinode thereof.

The quarter wave gas resonator may be in the form of a tube, channel or series of tubes connected by at least one channel.

Preferably, the quarter wave gas resonator reduces markedly in cross-section from its gas pressure node at its nozzle end to the location of the gas pressure antinode at its other end, so that the incoming gases at its nozzle end undergo a very significant convergent flow. The rate of convergence of such gases may be controlled by the profile of the walls of the resonator.

In this manner, convergent flow of the gases produces very effective adiabatic compression of the leading edge of the gas flow prior to ignition.

Pre-mixed fuel/air may be supplied to the resonator from an external carburettor via a port surrounding the pressure node, nozzle end of the resonator. Valve action can be achieved by flow separation. The exhausting jet pulses are thus emitted without significant entrainment of gases surrounding the nozzle end of the resonator.

During the low pressure phase of the engine cycle, fuel/air mixture is sucked into the resonator via the pressure node, nozzle end thereof and because the exhausting jet pulses tend to continue in their direction of motion, the fuel/air mixture will flow in laterally, with effective scavenging of the exhaust gases.

Ignition of the gas/air mixture can be arranged to occur at or adjacent the pressure antinode initiated by hot resonator walls.

Alternatively, a heater element may be interposed between the resonator walls to initiate ignition close to the pressure antinode. The local increase in pressure following ignition may be adapted to initiate a high velocity deflagration, preferably of higher velocity and pressure than the Chapman Jouget velocity associated with a stable detonation.

Alternatively, the convergence of the resonator walls may be adapted to produce a detonation directly or by impact and reflection of the convergent flow of the gas/air mixture at the pressure antinode end of the quarter wave resonator.

The convergence of the resonator towards the pressure antinode end thereof may be adapted so that the detonation can be sufficiently stable to detonate the whole of the gas/air mixture, despite the divergence of the flow of the exhausting gases toward the exhaust nozzle end of the resonator.

The resonator convergence can ensure that the exhausting jet pulses will traverse a divergent nozzle. Such divergence may be arranged so that a divergent jet pulse accelerates a large volume of bypass air in a surrounding thrust augmentor shroud.

The engine starter may comprise a heater element, such as an electrical heater element, which boils liquid fuel within, say, a fuel feed tube, so that a gaseous fuel jet is generated. This jet may be turbulent or turbulence may be induced by its interaction with the electrical heater element. In this manner, mixing of the gaseous fuel jet can entrain and mix with the surrounding gases.

Any heater element may be used to heat the fuel/air mixture to above its autoignition temperature to generate a flame. The heater element may then provide effective hot resonator walls, so that the flame can remain within the resonator. The flame and heater element may then be able to heat the resonator walls, so that the flame may be retained stably within the confines of the resonator. Heat will be conducted from the flame via the heater element and the resonator walls to the liquid fuel feed tube, so that the fuel will continue to evaporate and the resulting gaseous fuel jet will be maintained once power to the heater element is switched off. The flame will then be self-sustaining. The engine starter walls may be so adapted that the flame length and intensity will oscillate with a high gain, with such oscillation tending to increase rapidly and sufficiently to provide pulse jet operation of the engine. This may be used as a simple standalone pulse jet engine or may be coupled to, say, a channel-type quarter wave resonator which can provide much greater power with more efficiency.

The starter fuel supply may be a simple axial feed tube with the inertia of the liquid fuel in the cooler portion of the feed tube providing an effective gas seal at the gas pressure antinode of the quarter wave resonator.

Alternatively, the starter fuel supply may be a feed tube from a carburettor within the engine structure and of sufficient length that once the liquid fuel within it has been evaporated by engine heat, the tube is sufficiently out of tune with the engine resonance as to be impassable to gases. The liquid fuel in such an external carburettor may be vapourised by the engine heat, so that the carburettor jet meters gaseous fuel and a float chamber arrangement is not required.

Turbulators may be provided in the external carburettor to ensure intimate mixing of the fuel and air downstream of the carburettor venturi, prior to entry of the fuel/air mixture into the quarter wave resonator.

The pulse jet engine may be formed entirely or in part from a ceramic material and another preferred choice is partially-stabilised zirconia.

In operation, pulse jet engines convert a significant fraction of their power into sound, which is most unpleasant, if not dangerous, to be near. Despite their simplicity and low cost, this property makes them totally unacceptable as a general purpose power unit. Vibrations at higher frequencies than 20 kHz are undetectable by the human ear and are defined as ultrasonic. If the engine cycling frequency is greater than 20 kHz, that is to say, ultrasonic, the engine becomes silent to the human ear. Apart from silent operation, the use of an ultrasonic cycling frequency has important practical consequences.

For a given power, the swept volume of an internal combustion engine decreases with the reciprocal of its cycling frequency. A pulse jet engine operating ultrasonically at, say, 30 kHz will be six hundred times smaller than a conventional pulse jet engine operating at 50 Hz. The quarter wave length will be less than 10 mm and, therefore, the engine will be extremely compact and lightweight, as well as having a comparatively high power to weight ratio.

The fact that an ultrasonic pulse jet engine is so small means that it may be shrouded completely without significant weight or drag penalty. The high velocity gas pulses may be used to accelerate a large volume of bypass air within the shroud, so increasing thrust and improving aerodynamic efficiency considerably.

Since very high bypass ratios are possible and intimate mixing of the jet exhaust and bypass air is required to achieve this, the exhaust gas temperatures of a shrouded ultrasonic pulse jet engine will be close to ambient, resulting in much safer operation in general use.

The process of accelerating bypass air within any shroud will also act as an efficient silencer for the ultrasound generated by the engine. Despite the extremely high ultrasonic levels within the engine, any shroud or bypass air will reduce the levels in the exhaust gases significantly.

In addition, the attenuation of sound in air is proportional to the square of the frequency of the sound. In the example quoted hereinbefore, attenuation of any escaping ultrasound will be two hundred and fifty thousand times greater than for a conventional internal combustion engine. There will, therefore, be little long range acoustic output to annoy animals or wildlife with high frequency hearing ranges greater than humans. Indeed, an ultrasonic pulse jet engine in accordance with the invention should be substantially silent.

Further, the ultrasonic pulse jet engine is principally a quarter wave resonator with a resonance energy which cycles between the kinetic energy of the outgoing jet pulse, the kinetic energy of the incoming fuel/air mixture and the potential energy of the static compressed fuel/air mixture prior to ignition. The energy lost in the jet output is matched by that of the fuel combustion. The cyclic conversion of the resonant energy provides efficient operation of the engine cycle.

The quarter wave resonator reduces in cross-section from the gas pressure node at its exhaust nozzle to the opposed gas pressure antinode, whereby in-rushing fuel/air mixture undergoes convergent flow. The profile of the resonator walls provides very accurate control of the rate of convergence at each point along the resonator. If the reduction ratio in cross-sectional area is considerable, there is very significant adiabatic compression of the leading edge of the inflowing gases. Such precompression leads to significant increase in thermodynamic efficiency.

If the resonator is in the form of a tube, its length may be in the range of 4-10 mm to achieve ultrasonic operation. The diameter of the tube may decrease from possibly 4 mm to 0.1 mm, with a reduction in cross-sectional area of 1600:1. Given a fuel/air mixture pressure at the entrance to the exhaust nozzle end of the resonator of 1 bar, the pressure at the pressure antinode at the other end of the resonator, through adiabatic compression with such convergence, may be in excess of 20 bar. This compression ratio compares with piston or turbojet engines. The rate of convergence may be controlled closely by the profile of the quarter wave resonator walls and this will have significance for the compression ratio achieved, the mode of combustion and divergence of the exhausting jet pulse.

Another aspect of the invention resides in a jet engine including a combustion chamber having a wall which, during use of the engine, is heated or heatable to a temperature sufficient to ignite or enhance ignition of the fuel feed to the combustion chamber. Preferably the engine is an ultrasonic pulse jet engine which may incorporate one or more of the modifications described above in relation to the one aspect of the invention.

BRIEF DESCRIPTION OF THE DRAWINGS

In order that the invention may be more fully understood, embodiments of ultrasonic pulse jet engine will be now be described by way of example and with reference to the accompanying drawings in which.

DETAILED DESCRIPTION OF THE INVENTION

Figure 1:
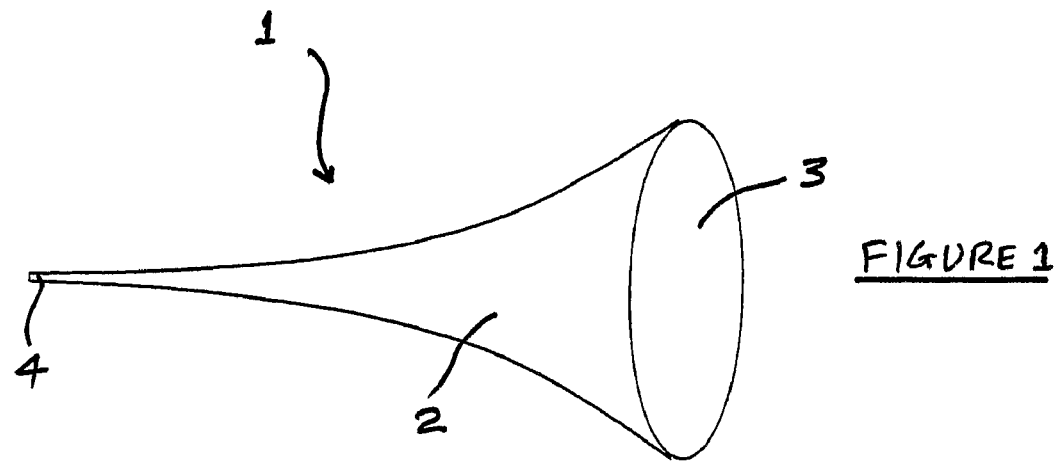
FIG. 1 is a diagrammatic perspective view of a quarter wave gas resonator of a first embodiment of ultrasonic pulse jet engine.

Referring firstly to FIG. 1 of the drawings, a first embodiment of ultrasonic pulse jet engine comprises a quarter wave gas resonator 1 in the form of a tube 2 of reducing circular cross-section to converge from the jet nozzle 3 at its wider pressure node end to a closed pressure antinode 4 at its other end. The cross-section of the tube 2 may be triangular, square, rectangular or any other suitable shape, which could change along its length. The convergence of the reducing cross-section of the resonator tube 2 can be any one of a wide range of profiles. However, whatever the particular profile of the resonator tube 2 might be, it provides a relatively small swept volume which tends to limit the power achievable by the engine. A large number of independent resonator tubes 2 may be used but a more suitable arrangement is a channel cross-sectioned resonator, such as that shown generally at 2 in FIG. 2.

Figure 2:
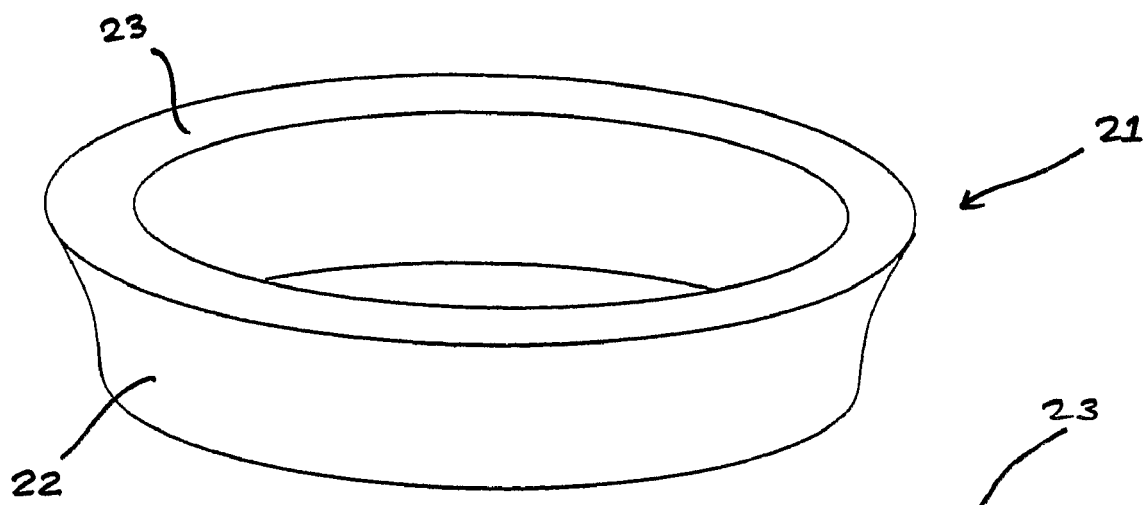
FIG. 2 is a diagrammatic perspective view of a quarter wave gas resonator of a second embodiment of ultrasonic pulse jet engine.
Figure 2A:
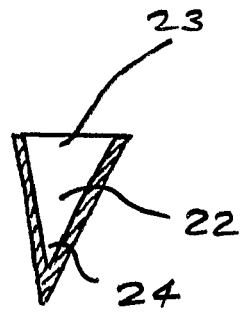
FIG. 2A is a section of the resonator shown in FIG. 2.

In this second embodiment of ultrasonic pulse jet engine shown in FIGS. 2 and 2A, the quarter wave gas resonator 21 is in the form of a closed loop, annular channel 22 including an annular jet exhaust orifice 23 at its pressure node end, which reduces to converge to a closed pressure antinode 24. The cross-section of the channel 22 is shown in FIG. 2A.

This second embodiment provides a much larger swept volume. However, any suitable channel-shaped resonator, such as a linear channel-shaped resonator, may be suitable. However, a disadvantage of this particular arrangement is that the convergence of the incoming fuel/air mixture due to the reduction in the cross-section of the annular resonator channel 22 reduces effectively from two dimensions to one dimension. This has an effect on the adiabatic compression ratio of the fuel/air mixture achievable at the closed pressure antinode 24.

Figure 3:
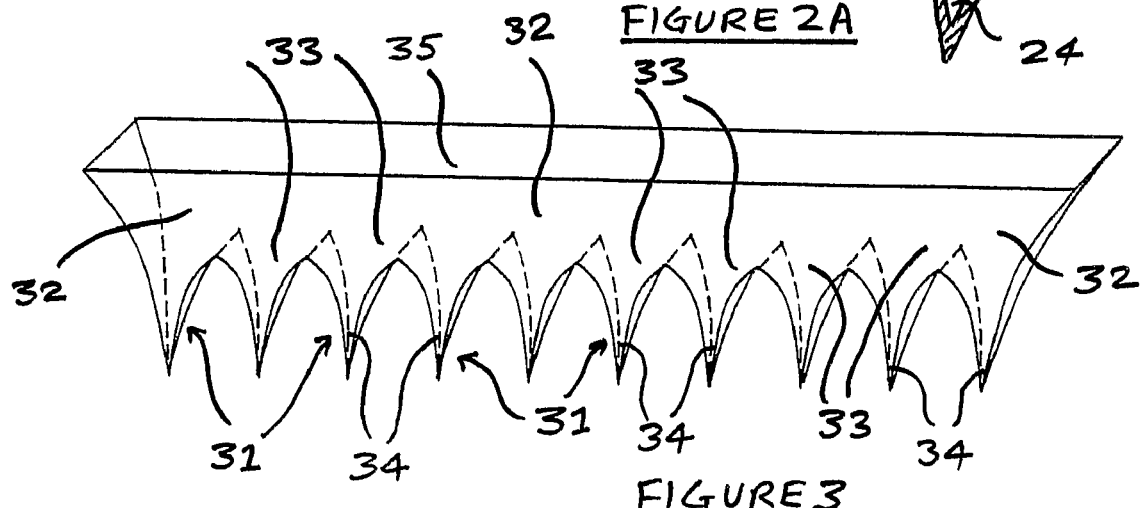
FIG. 3 is a diagrammatic perspective view of a plurality of quarter wave gas resonators of a third embodiment of ultrasonic pulse jet engine.

A compromise solution is shown in the third embodiment of ultrasonic pulse jet engine shown in FIG. 3, wherein in a plurality of parallel, converging cross-section resonators 31 are coupled together in partial commonality by a channel 32 which is formed effectively by the jet nozzles 33 of the resonators 31 and which forms the overall jet nozzle 35 of the engines. Each resonator 31 has a greatly reduced cross-section at its gas pressure antinode 34.

Figure 4:
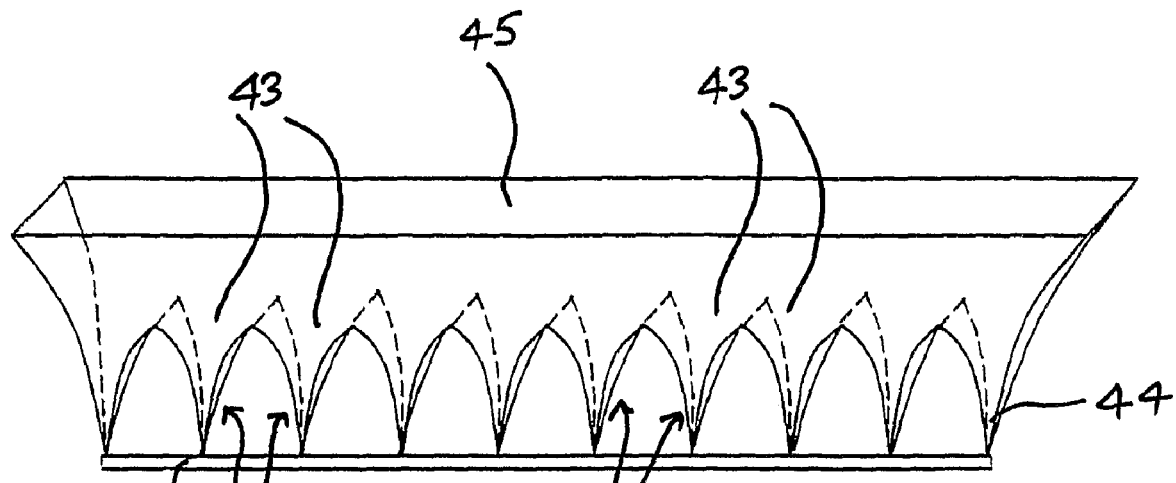
FIG. 4 is a diagrammatic perspective view of a fourth embodiment of ultrasonic pulse jet engine similar to that of FIG. 3 but with the plurality of resonators coupled together.
Figure 4A:
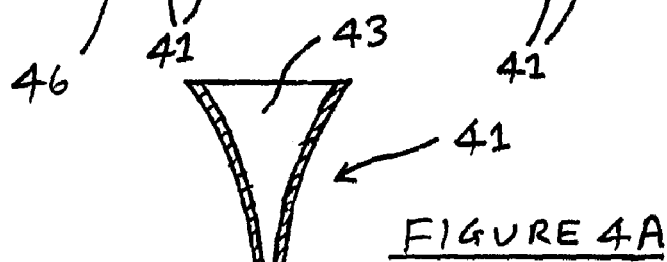
FIG. 4A is a section of one or the resonators shown in FIG. 4.

Alternative or additional coupling may be achieved by interconnecting the pressure antinodes 44 of a fourth embodiment of ultrasonic pulse jet engine by a fine bore pipe 46, as shown in FIGS. 4 and 4A. This has the advantage that hot gases may propagate along the pipe 46 to the pressure antinodes 44 of the tubular resonators 41, thereby igniting the fuel/air mixture and initiating adjacent resonators 41 more rapidly than those of the third embodiment of engine discussed above in relation to FIG. 3. In this embodiment, each quarter wave generator 41 again has a jet nozzle 43 which forms, in unison with the other nozzles 43, the overall jet nozzle 45 of the engine.

Figure 5:
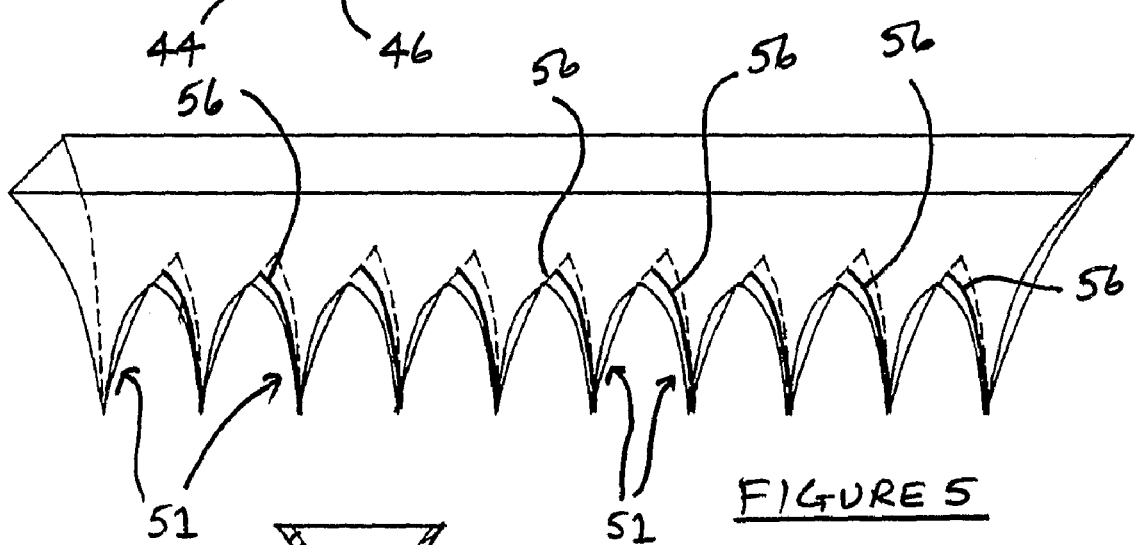
FIG. 5 is a diagrammatic perspective view of a fifth embodiment of ultrasonic pulse jet engine again with a plurality of resonators coupled together.
Figure 5A:
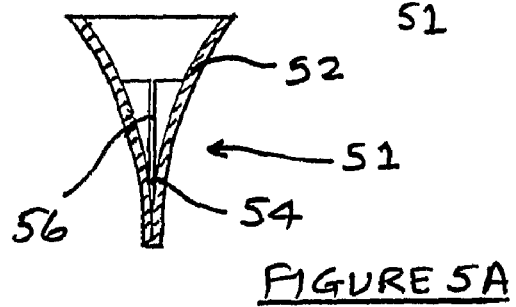
FIG. 5A is a section of one of the resonators shown in FIG. 5.

Yet another alternative would be to provide slits 56 in the partitioning walls 52 of adjacent tubular resonators 51, as shown in the fifth embodiment of FIGS. 5 and 5A. In this manner, the slits 56 perform essentially the same function as the pipe 46 of the fourth embodiment described above in relation to FIGS. 4 and 4A, to provide a compact high power ultrasonic pulse jet engine which offers a higher compression ratio with a single starter for initiating the starting gas oscillations in the region of the quarter wave antinodes 54 via one or more of the resonator coupling arrangements discussed above in relation to FIGS. 4 and 4A and 5 and 5A.

All known pulse jet engines to-date have a fuel supply to the engine which is separate from the fresh air to be burnt with the fuel. This poses two major problems. First, control of the fuel/air mixture is indirect and somewhat crude. Rich mixtures are generally used to ensure combustion, so fuel efficiency is unnecessarily low. Second, fuel/air mixing takes place within the combustion chamber during the brief period between induction and ignition. This is insufficient to achieve complete combustion even in slow cycling pulse jet engines and is impossible in one cycling at ultrasonic frequencies. This, too, results in having to use extra rich mixtures to compensate for inefficient fuel utilisation.

In the ultrasonic pulse jet engines according to the invention, an external carburettor may be provided.

Engine heat can be used to evaporate the fuel, so that the carburettor jets meter gaseous fuel not liquid fuel. This implies that there is no need for a float chamber or its equivalent to ensure a constant head of liquid fuel supply. It also implies that the engine will run just as well inverted, which has advantages for aerospace applications. Downstream of the carburettor, there may be a number of obstructions to ensure turbulent flow and intimate mixing of the fuel and air before the fuel/air mixture reaches the resonator. The output of the carburettor may be an inlet port for that part of the engine surrounding the jet nozzle. This arrangement ensures that the fuel/air mixture is supplied to the engine with carefully controlled stoichiometry and as an extremely homogeneous mixture. This is likely to lead to low particulate emissions.

Pulse jet engines known to-date require a valve arrangement to let in a fresh air during the low pressure phase. Mechanical valves suffer fatigue failure at conventional frequencies, so it would be extremely difficult to design and fabricate such valves to operate at ultrasonic cycling frequencies. A number of ingenious valveless pulse jet engines have been designed in which changes in airflow constitute a valve arrangement. In an ultrasonic pulse jet in accordance with the invention, flow separation at the jet nozzle can be used. The outgoing jet pulse is high velocity and directed principally in the direction of thrust. Because of the unsteady flow and short cycle period, there is insufficient time to entrain a significant volume of the surrounding gas into the jet pulse. During the ensuing low pressure phase of the cycle, the surrounding gas is sucked into the engine via the jet nozzle. Because the tail end of the jet pulse still has forward momentum, it will preferentially leave the engine, replacing it with radial inflow from the surrounding gas. In this manner, there may be efficient scavenging of the exhaust gases.

After burning the previous gas/air mixture, the combustion products issue from the jet nozzle at high speed. This is highly unsteady flow and there is insufficient time to develop a significant boundary layer between the outgoing jet pulse and the surrounding fuel and air. There will, therefore, be very effective flow separation.

In previous engines based on this principle, the surrounding gas is just air. In the present invention, the jet nozzle may be surrounded by pre-mixed fuel and air with no danger of flashback into the carburettor. While the jet pulse will be well above the autoignition temperature of the fuel/air mixture, at ultrasonic cycling frequencies there will be insufficient time for a flame to propagate effectively into the fuel-air supply and hence no possibility of a flashback to the carburettor. For example, at 30 kHz, the cycle time will be 33 microseconds of which the jet emission period may be as little at 5 microseconds. A laminar flame might propagate 2 micrometres in this time frame and a turbulent flame, 0.1 mm, neither of which will be significant. A flame arrestor may be fitted between the carburettor and the jet nozzle, if desired, in case of flashback when starting, but it is unlikely that this will be necessary.

Combustion of the fuel during the brief period available presents a challenge. There are two solutions. The fuels may be burnt by strong deflagration or by detonation.

A laminar flame travels at less than a metre per second and a turbulent flame at some tens of metres per second, neither of which is fast enough to consume all the fuel/air mixture. A hydrocarbon-air detonation typically travels at around 2000 m/s with a peak pressure to 20 bar and peak temperature of 2000° C. Combustion would take 5 microseconds in a 10 mm long quarter wave resonator. A strong deflagration is defined as a flame which travels faster than the Chapman Jouget velocity calculated for detonation wave propagation. There is no shock front associated with it and thermodynamically, combustion is more efficient. The peak pressure within the strong deflagration is greater than that in Chapman Jouget detonation wave and the propagation velocity is greater. However, strong deflagrations are fundamentally unstable in that they will rapidly transition into a detonation. If control of this instability is a major problem, a weak deflagration travelling just marginally slower that the Chapmen Jouget velocity is an alternative, though less efficient solution, to burning the fuel/air mixture.

A quarter wave resonator of an ultrasonic pulse jet engine in accordance with the invention is divergent with respect to the outgoing combustion pulse. The resulting expansion of the wave front will tend to reduce the pressure within it which in turn will reduce the velocity of propagation. By controlling the rate of divergence it will be possible to control the stability of a strong deflagration, postponing the point of transition into a detonation. The quarter wave resonator is also very short in terms of the normal propagation distance required for a deflagration to detonation transition. This too will assist in maintaining stability for the duration of the burn cycle. The best solution to combustion in this engine, therefore, is the use a strong deflagration with careful control of its stability.

Initiation of a strong deflagration can be via the hot resonator walls which will be so far above the autoignition temperature that ignition of the fuel/air mixture at the walls will be virtually instantaneous. The inflow of the fuel/air mixture will approximate inviscid as the maximum boundary layer thickness will be less than 0.01 mm in the unsteady flow. The flame at the wall will be laminar and will propagate possibly less than 0.005 mm at the jet nozzle during the low pressure phase of the engine cycle. It will not significantly ignite the inflowing charge. However, as the fuel/air mixture progresses into the quarter wave resonator, the leading edge thereof is adiabatically compressed which raises its temperature. It will rapidly exceed the autoignition temperature, but compression ignition will not occur because the latent period will be too long for the time frame available.

However, flame propagation speeds increase at approximately the square of absolute temperature. Thermal conduction will be too slow to have an effect at ultrasonic cycling speeds and air is essentially transparent to radiation from the walls. The increase in temperature due to adiabatic compression will, however, be very significant. The infrared radiation from the walls will be absorbed by the fuel and may cause partial pyrolysis of the fuel molecules, which predisposes the fuel to ignite and will enhance flame velocity. There will be a point in the converging quarter wave resonator when a significant fraction of the charge will burn due to ignition from the walls. This will increase the pressure locally which in turn will increase the adiabatic compression of the fuel/air mixture. This will further increase the flame speed and hence the local pressure. There will be localised runaway combustion, which will greatly increase the local pressure. Indeed, this will be high enough to initiate a strong deflagration. A pressure of 40 bar or more should be attainable. This is likely to occur over an axial length of less than a millimetre. This pressure is significantly greater than in a Chapman Jouget detonation and a strong deflagration will result.

Figure 6A:
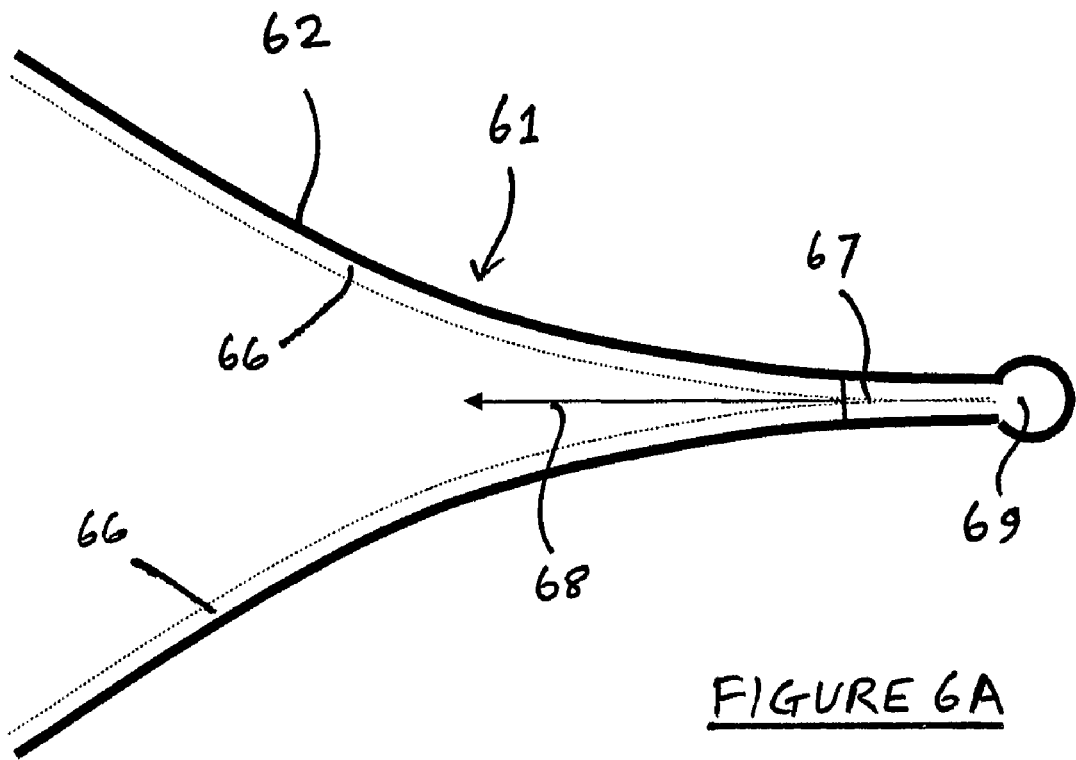
FIG. 6A is a is a sixth embodiment of ultrasonic pulse jet engine shown diagrammatically, utilising hot wall ignition.

The situation is illustrated schematically in FIG. 6A. The reducing cross-section of the wall of the quarter wave gas resonator 61 is shown at 62. The incoming fuel/air mixture results in a slow flame 66 at the quarter wave resonator wall 62. At a given location 67 in the region of the pressure antinode 64 of the resonator 61, heat from the walls 62 causes runaway ignition of the fuel/air mixture resulting in an outgoing strong deflagration 68 away from the pressure antinode 64.

It is possibly desirable to have a small gas reservoir 69 at the pressure antinode 64 at the end of the quarter wave resonator. While exhaust scavenging is good, there is a small amount of exhaust gas left within the resonator 61. It is important that fuel/air mixture reaches the ignition location 67, so this reservoir 69 may accept the remaining exhaust gas. It may conveniently be a similar arrangement to the coupling pipe 46, of FIG. 4.

Figure 6B:
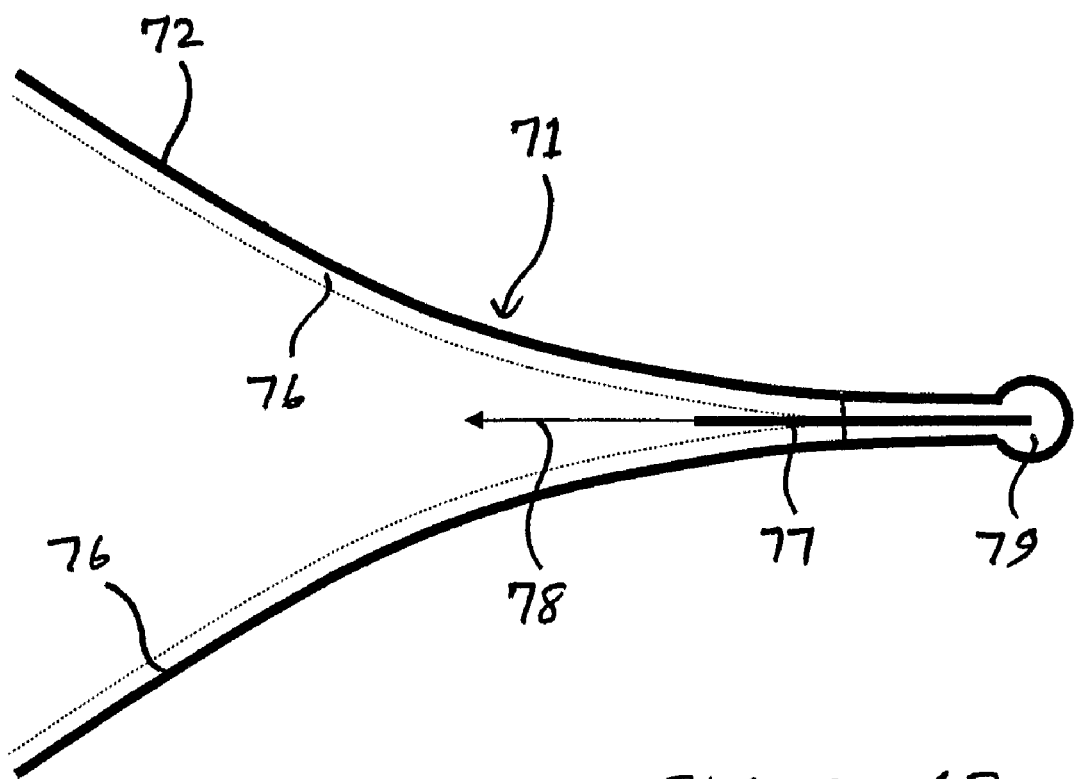
FIG. 6B is a diagrammatic view of a seventh embodiment of ultrasonic pulse jet engine utilising heated element ignition.

While ignition by the wall 62 is the preferred mode of ignition, in an engine fabricated from metal the wall 62 must be cooled to preserve its integrity. In such a situation, a heated element, such as that shown at 77 in FIG. 6B, which is heated by the engine gases, may be used. In FIG. 6B, components prefixed by "7" are generally the same as those prefixed by "6" in FIG. 6A.

While a strong deflagration is the best option for combustion, a detonation wave is another alternative. The convergence of the channel will be less than for initiation of a strong deflagration so that premature ignition is not a problem.

The closed end of the quarter wave resonator is preferably planar and incoming fuel/air mixture will rapidly become supersonic. It may form an incoming shock front due to the convergence of the walls of the quarter wave resonator. If so, the convergent shock front will increase in strength according to $r^{-0.8}$. If a shock front forms at a radius of 1.5 mm and the quarter wave resonator terminates at a radius of 0.25 mm, the shock strength will be 4. The shock will be reflected by the end wall which may provide strengthening of up to times six or a shock strength of 24. A strength of 20 is required to initiate a detonation wave.

The incoming flow may have insufficient time to develop a shock front but the high speed gas flow impacting on the end wall of the quarter wave resonator most certainly will. The strength of this should be sufficient to initiate detonation. Partial pyrolysis of the fuel by infrared radiation from the quarter wave resonator walls will relax the conditions for detonation. The convergence of the walls may be optimised to produce a strong shock. The end wall may be polyhedral to intensify the shock by multiple reflection or concave to increase it by further convergence on reflection.

Figure 6C:
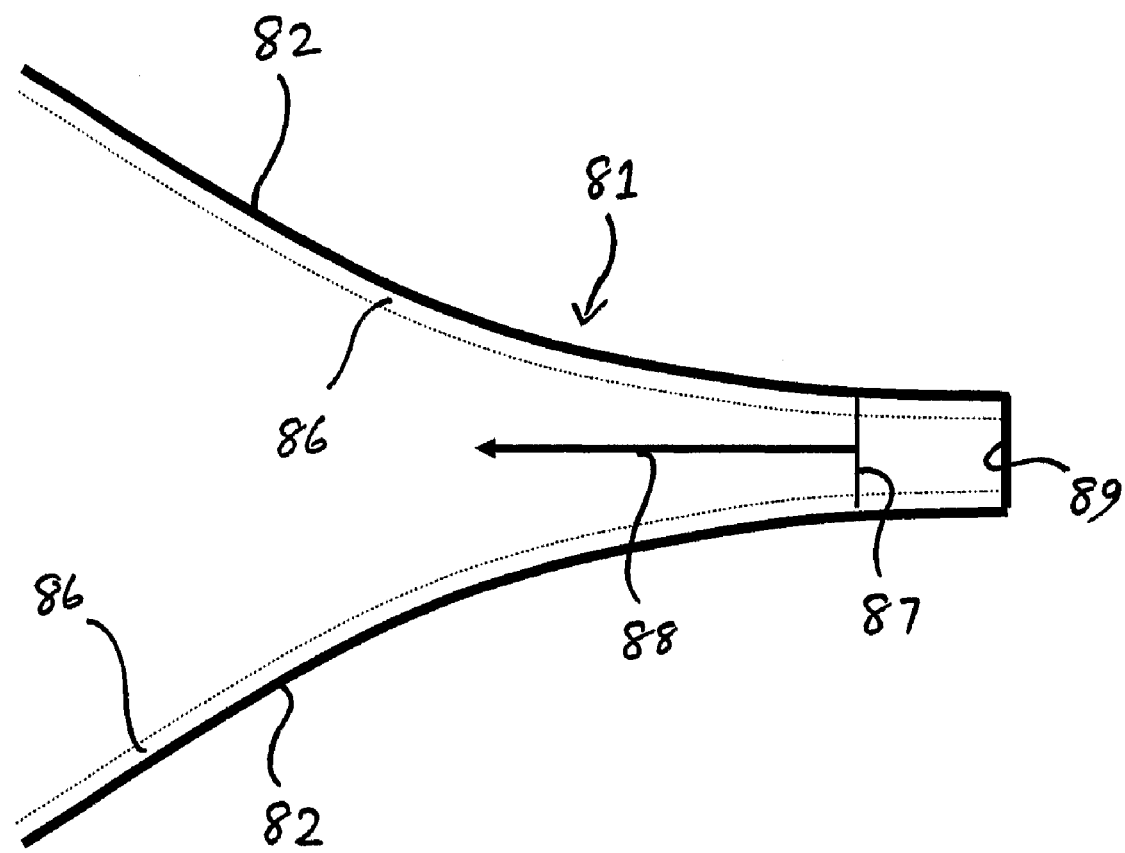
FIG. 6C is a diagrammatic view of an eighth embodiment of ultrasonic pulse jet engine illustrating detonation wave ignition.

The situation is illustrated schematically in FIG. 6C. The incoming fuel/air mixture again initiates slow flames 86 at the wall 82 but the cross-section of the resonator is sufficiently large for these flames 86 not to precipitate ignition. There is reflection from the end wall 89 at the pressure antinode end of the resonator 81 to generate at 87 an outgoing detonation wave, 88. A reservoir for the residual exhaust gases is not needed in this case.

Convergent flow of the fuel/air mixture to the pressure antinode of the resonator 81 can cause adiabatic compression of that mixture which is sufficient to ignite the mixture, as an alternative method of ignition. This compression can be increased by reflection of the flow of incoming fuel/air mixture at the pressure antinode.

It is notoriously difficult to start liquid-fuelled pulse jet engines. In engines in accordance with the present invention, there may be used an electrical heater element partly within a liquid fuel feed tube and partly within the quarter wave resonator. On passing current through the electrical heater element, liquid fuel in the fuel feed tube is heated to boiling point. The volume of gaseous fuel so-formed is collimated by the fuel feed tube to form a fuel gas jet within the resonator. It may be arranged that the jet is inherently turbulent or the jet may be made turbulent by interaction with the portion of the electrical heater element within the quarter wave resonator. The turbulent fuel gas jet will entrain the adjacent air to form a fuel/air mixture. The electrical heater element can heat the fuel/air mixture to above the autoignition temperature of the temperature, to cause it to burst into flame.

Flames will not persist in a cold walled resonator smaller than a given diameter because of heat loss to the walls. An ultrasonic quarter wave resonator will be well below this minimum diameter. The electrical heater element will provide effective hot walls to maintain the flame temporarily. The flames will rapidly heat the walls of the quarter wave resonator until the temperature is above that required to sustain the flame within the resonator. The walls of the quarter wave resonator and the dimensions of the electrical heater element are such that heat conducted back to the fuel feed tube by the walls and the electrical heater element is sufficient to maintain the required flow of gaseous fuel in the jet, once the electrical supply to the heater element is terminated.

The quarter wave resonator walls around the electrical heater element are so designed that the flame is unstable. A small increase in pressure will cause the flame to retreat into the quarter wave resonator where the convergent walls are closer together. The increase in combustion rate due to the closer hot walls coupled with the increase in pressure from this perturbation will cause the flames to burn more intensely. This in turn will cause the flames to expand from the quarter wave resonator and decrease in pressure, both of which will result in a decrease in flame intensity. With correct design of the quarter wave resonator walls and the electrical heater element, the flame oscillation will rapidly increase in amplitude until it is operating as a pulse jet engine.

Such a starter arrangement may operate as a standalone ultrasonic pulse jet engine but the power will be strictly limited and the efficiency of fuel combustion will be poor. If the heater element and fuel food tube are placed within a channel shaped quarter wave resonator, the heat from the starter flame may boil fuel to prime a carburettor and may induct fuel/air mixture from a port surrounding the jet nozzle, so that the engine cycling may start in earnest and propagate rapidly along the channel.

The liquid feed in the fuel feed tube will seal the pressure antinode to gas flow.

Alternatively, a liquid fuel feed tube may be provided within the engine, whose length is significantly greater than the axial length of the quarter wave resonator, such that the fuel within it can evaporate once the engine is fully operational. The length of such a fuel feed tube will ensure that it is so far from the engine resonant frequency that there will be no significant gas flow from the quarter wave pressure antinode. The evaporation of the fuel will ensure termination of inefficient fuel feed to the starter flame, once it has accomplished its purpose.

It is convenient to make the engine at least partially from a ceramic material. Ceramics cope with high temperatures exceptionally well. High temperature-proof gas tight seals are simple to engineer. The low thermal conductivity of ceramic material eliminates the need for extensive insulation. Partially-stabilised zirconia is the material of choice. The strength of the zirconia material in tension at lower temperatures may be exploited to handle the engine loads.

Figure 7A:
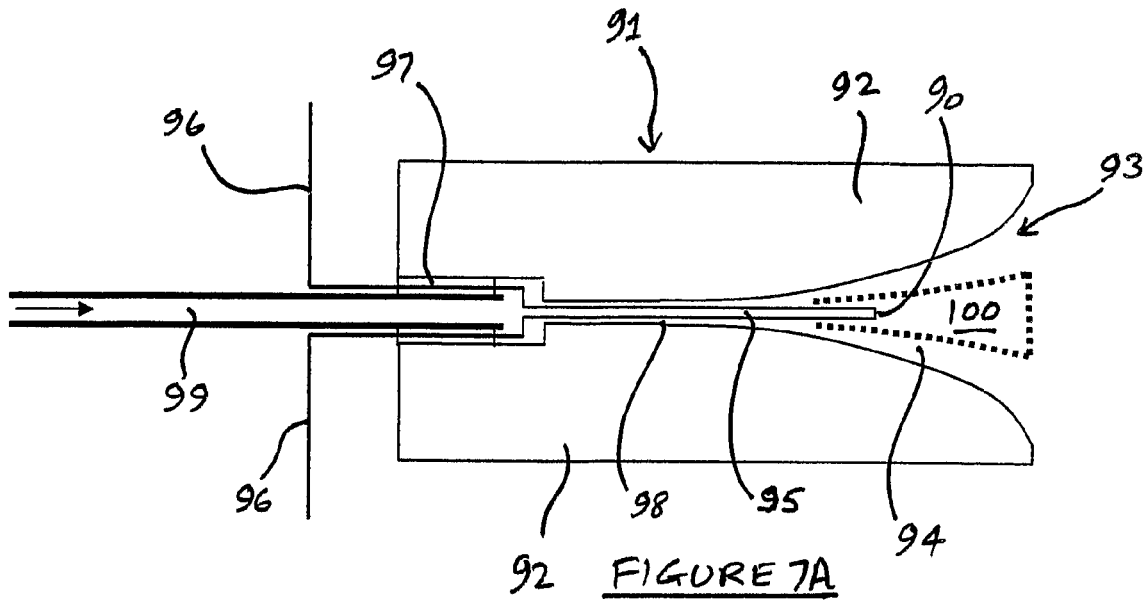
FIGS. 7A and 7B are respective diagrammatic orthogonal cross-sections of a starter arrangement for a ninth embodiment of ultrasonic pulse jet engine.
Figure 7B:
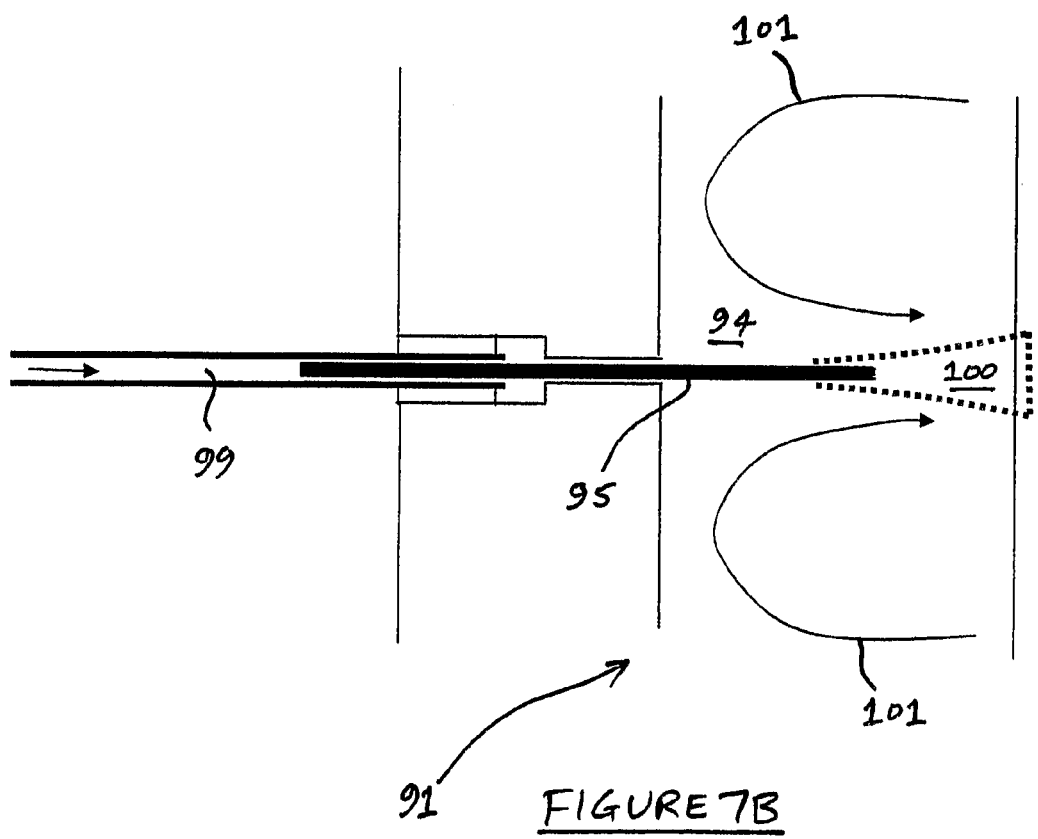

FIGS. 7A and 7B show two orthogonal sections through a simple starter unit for the engine. There is a quarter wave resonator 91 fabricated in zirconia, which incorporates a jet nozzle 93 at the pressure node of the converging resonator walls 92, an axial liquid fuel feed tube 99, an electrical heater element 95 made from ribbon resistance wire and spot welded to low resistance connector wires 96 and a silicone rubber seal 97. When the liquid fuel supply is turned on, liquid fuel seeps into the engine under the action of surface tension forces. The electrical heater element 95 is turned on and this boils fuel within a capillary tube 98 between the fuel feed tube 99 and the resonator cavity 94. The now gaseous fuel will form a jet 100 which will exhaust through the jet nozzle 93. Interaction of this jet 100 with a fold 90 in the ribbon resistance wire 95 will ensure turbulent flow. This turbulent flow will entrain air which serves the dual function of creating a combustible mixture with the gaseous fuel and setting up a convective flow 101, 21 as shown in FIG. 7B, which provides fresh air for combustion.

The heater element 95 will also heat the air in the convective flow, so that the fuel/air mixture may be well above its autoignition temperature. The resonator cavity 94 necessarily has a small cross-section. It will, of necessity, be smaller that the minimum tube diameter required to support a flame between cold walls. The heater ribbon 95 will provide the hot walls initially to support a flame within the resonator cavity 94. It will also heat the resonator walls 92 so that the flame may be self-sustaining.

The starter is arranged so that once the electrical supply is disconnected, sufficient heat is conducted to the capillary tube 98 to continue to boil liquid fuel at a sufficient rate to sustain the flame within the resonator 91. The convergence of the resonator cavity walls 92 is such that the resonator cavity 94 acts as an oscillator of very high gain.

If there is a pressure perturbation which compresses the gases within the resonator 91, the flame is forced to a narrower section of the resonator cavity 94. Heat from the closer resonator walls 92 and the slightly increased pressure will cause a slightly higher rate of combustion, which in turn will create a higher pressure. This will force the flame out to a broader section of the resonator 91 where the reverse process will occur. This oscillation will increase.

Figure 8A:
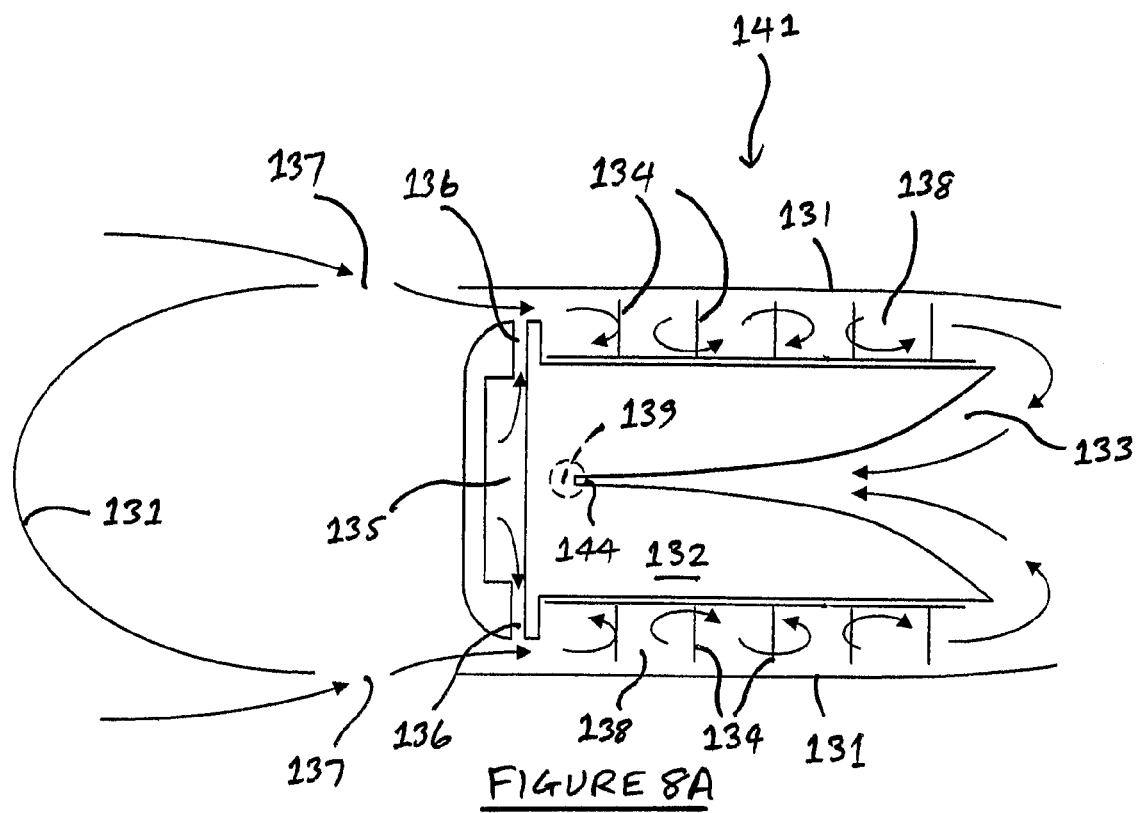
FIGS. 8A and 8B are respective illustrative views of the induction and exhaust modes of an eleventh embodiment of ultrasonic pulse jet engine.
Figure 8B:
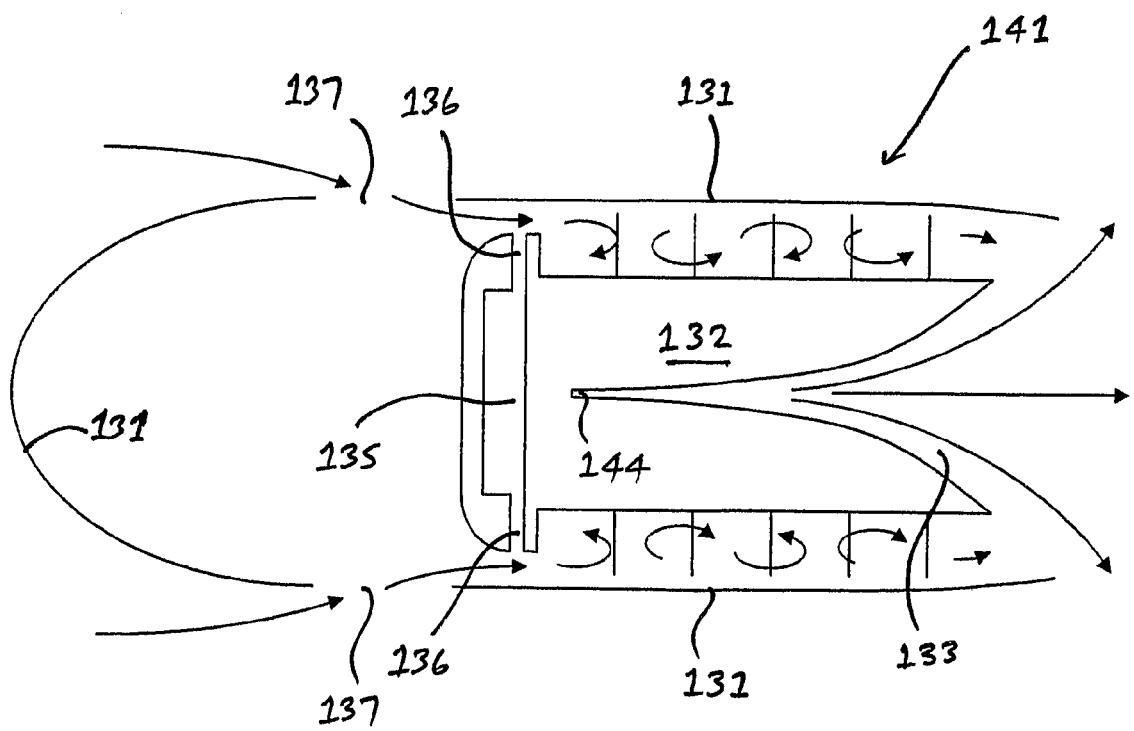
Figure 8C:
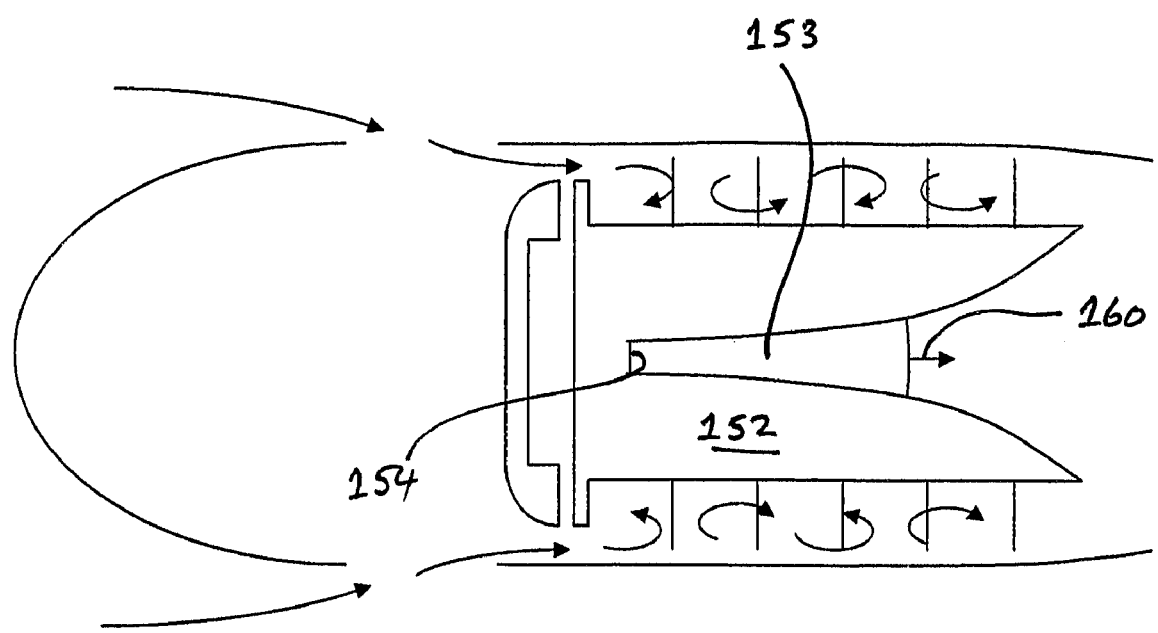
FIG. 8C is a diagrammatic view of a twelfth embodiment of ultrasonic pulse jet engine utilising detonation ignition.

Flow separation at the jet nozzle 93 will cause inflow of air from a surrounding carburettor, as shown in FIGS. 8A to 8C. Heat from the starter flame will feed back to evaporate liquid fuel in the carburettor. The oscillation will therefore start the engine in the adjacent resonator cavity 93 and the oscillation will spread until the whole engine is cycling.

The arrangement shown in FIGS. 7A and 7B can function as a standalone engine if the resonator cavity 93 is truncated laterally. The oscillation may become of sufficient amplitude to generate thrust. However, the mixing of fuel and air will not be optimal and efficiency will be sacrificed for simplicity.

Figure 7C:
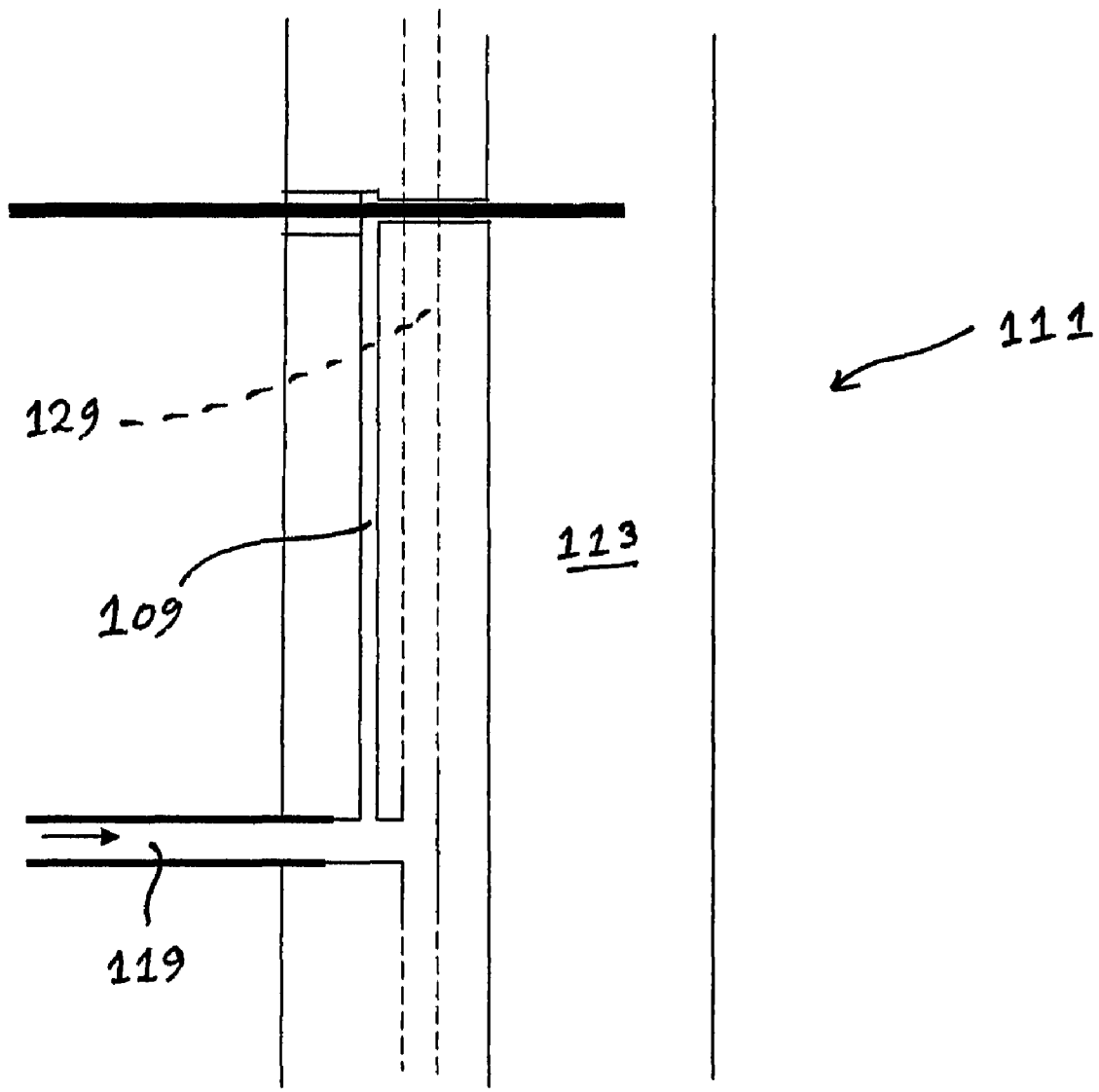
FIG. 7C is a diagrammatic view of a fuel feed arrangement for a tenth embodiment of ultrasonic pulse jet engine.

FIG. 7C shows a slightly different arrangement where liquid fuel is fed laterally through a tube 109 directly from the fuel feed tube 119. The length of tube 109 is significantly greater than the length of the resonator cavity 113, so that when the fuel evaporates in the tube 109 there is no significant transmission of gases to or from the resonator 111. Tube 109 is placed further away from the resonator than a tube 129 which supplies a carburetor, as shown in FIGS. 8A and 8C, so that engine heat may fully evaporate the carburettor fuel supply before the starter flame cuts out.

FIGS. 8A and 8B show sections through a resonator cavity 133 and associated carburettor which burns the fuel as a strong deflagration. The resonator and turbulator are formed as a zirconia moulding 132 with an aluminium fairing 131 and turbulator pins 134 pressed from a cylindrical Inconel plate. The zirconia moulding 132 incorporates a gaseous fuel feed channel 135, carburettor nozzles 136 and a resonator cavity 133, with converging walls. The aluminium fairing 131 incorporates air inlet ports 137 and the proximity of the fairing 131 to the zirconia moulding 132 forms a carburettor venturi at 138 and an abrupt step in the zirconia moulding 132 will generate turbulent flow to aid fuel/air mixing. The turbulator pins 134 are set perpendicularly to the mean fuel and air flow to complete intimate fuel/air mixing prior to entry into the resonator cavity 133.

This starter arrangement establishes a large local oscillation and the engine heat from this will evaporate fuel in the carburettor feed tube 135. The starter oscillation will then suck fuel/air mixture from the carburettor into the resonator cavity 133 and the oscillation will increase in amplitude. The increase in heat flow from the engine will cause further evaporation of fuel in the carburettor feed tube 135, and the oscillation to spread along the adjacent resonator cavities 133, until the whole resonator is cycling.

While exhaust gas scavenging will be quite efficient, it may be necessary to have a small chamber 139 at the pressure antinode end 144 of the quarter wave resonator 141, to accommodate any remaining exhaust gas and enable the fuel/air mixture to penetrate the resonator 141 to the required depth.

FIG. 8C shows a similar section for an engine which ignites the fuel/air mixture as a detonation wave. The channel-shaped resonator cavity 153 is slightly broader, so as to prevent ignition of the fuel/air mixture by the hot cavity walls 152. There is also a planar end 154 to the cavity 153 at the pressure antinode 154 to reflect the incoming gas flow or shock wave, thereby generating a shock front of sufficient strength to ignite the fuel/air mixture as a detonation wave 160.

The engines may be surrounded by an augmentor shroud or otherwise associated with an augmentor tube, to accelerate bypass air, thereby enhancing the aerodynamic efficiency of the engine.

The invention claimed is:

1. A pulse jet engine comprising a cavity quarter wave gas resonator having a gas pressure node at a nozzle end for combustion gases outlet and a gas pressure antinode at an opposite end, the quarter wave gas resonator being arranged to cycle at an ultrasonic frequency, wherein the quarter wave gas resonator is at least substantially closed to gas flow at said opposite end having the gas pressure antinode, the quarter wave gas resonator having a cross sectional area that reduces between the nozzle end and the opposite end, so that incoming gases into the nozzle end undergo significant convergent flow towards the opposite end during operation of the pulse jet engine.

2. The pulse jet engine according to claim 1, wherein the cross sectional area of the quarter wave gas resonator reduces continuously between the nozzle end and the opposite end.

3. The pulse jet engine according to claim 1, comprising a plurality of the quarter wave gas resonators coupled together.

4. The pulse jet engine according to claim 3, wherein the plurality of the quarter wave gas resonators is linear in shape.

5. The pulse jet engine according to claim 3, wherein the plurality of the quarter wave gas resonators is arcuate in shape.

6. The pulse jet engine according to claim 5, wherein the plurality of the quarter wave gas resonators is circular in shape.

7. The pulse jet engine according to claim 3, wherein the quarter wave gas resonators are coupled together by partial commonality.

8. The pulse jet engine according to claim 3, wherein the quarter wave gas resonators are coupled together by one or more pipes.

9. The pulse jet engine according to claim 3, wherein the quarter wave gas resonators are coupled together by one or more slots.

10. The pulse jet engine according to claim 1, wherein the quarter wave gas resonator comprises a channel.

11. The pulse jet engine according to claim 10, wherein the channel is linear in shape.

12. The pulse jet engine according to claim 10, wherein the channel is arcuate in shape.

13. The pulse jet engine according to claim 10, wherein the channel is a closed loop.

14. The pulse jet engine according to claim 13, wherein the channel is circular in shape.

15. The pulse jet engine according to claim 1, wherein the quarter wave gas resonator comprises a tube.

16. The pulse jet engine according to claim 1, where the reduction in cross-sectional area from the nozzle end to the opposite end of the quarter wave gas resonator and the resulting adiabatic compression of the incoming gases comprising a fuel/air mixture at or adjacent the pressure antinode of the quarter wave gas resonator is arranged, in use of the pulse jet engine, to cause a deflagration of the fuel/air mixture.

17. The pulse jet engine according to claim 16, wherein, in use of the pulse jet engine, the stability of the deflagration of the fuel/air mixture is dependent upon the increase in cross-sectional area of the quarter wave gas resonator from the opposite end to the nozzle end thereof.

18. The pulse jet engine according to claim 1, wherein the reduction in cross-sectional area from the nozzle end to the opposite end of the quarter wave gas resonator causes, in use of the pulse jet engine, convergent flow of the fuel/air mixture to produce adiabatic compression thereof at or adjacent the pressure antinode.

19. The pulse jet engine according to claim 18, wherein said adiabatic compression of the fuel/air mixture at or adjacent the pressure antinode of the quarter wave gas resonator is sufficient to enhance or cause compression ignition of said mixture.

20. The pulse jet engine according to claim 1, wherein the temperature of a wall of the quarter wave gas resonator, during use of the pulse jet engine, is sufficiently high to enhance or cause ignition of the incoming gases comprising a fuel/air mixture at or adjacent the pressure antinode of the quarter wave gas resonator.

21. The pulse jet engine according to claim 1, including a fuel/air mixture ignitor at or adjacent the pressure antinode of the quarter wave gas resonator.

22. The pulse jet engine according to claim 21, wherein the ignitor comprises a ceramic or noble metal material.

23. The pulse jet engine according to claim 1, wherein the reduction in cross-sectional area of the quarter wave gas resonator from the nozzle end to the opposite end thereof is arranged to cause, in use of the pulse jet engine, supersonic flow of the incoming gases comprising a fuel/air mixture and to form a convergent shock front.

24. The pulse jet engine according to claim 23, wherein, in use of the pulse jet engine, the shock strength of the so-formed convergent shock front is increased by reflection of that front at the pressure antinode of the quarter wave gas resonator, thereby causing ignition of the fuel/air mixture as a detonation wave.

25. The pulse jet engine according to claim 1, wherein the reduction in cross-sectional area of the quarter wave gas resonator from the nozzle end to the opposite end thereof is arranged to cause, in use of the pulse jet engine, the incoming gases comprising a fuel/air mixture to accelerate and to impact the quarter wave gas resonator at the opposite end thereof, to generate a returning shock front of sufficient strength to cause ignition of the fuel/air mixture as a detonation wave.

26. The pulse jet engine according to claim 1, further comprising a heater element arranged to boil liquid fuel to produce a gaseous fuel jet within the quarter wave gas resonator.

27. The pulse jet engine according to claim 26, further comprising means arranged to cause turbulence in the gaseous fuel jet.

28. The pulse jet engine according to claim 27, including means arranged to mix the resulting turbulent gaseous fuel jet with air.

29. The pulse jet engine according to claim 28, further including means arranged to heat the resulting mixture of gaseous fuel and air to above the autoignition temperature thereof, to provide a starter flame.

30. The pulse jet engine according to claim 29, wherein a heater element is arranged to compensate for heat losses to a wall of the quarter wave gas resonator, to maintain the starter flame.

31. The pulse jet engine according to claim 30, including means arranged to cause, in use of the pulse jet engine, the starter flame to heat a wall of the quarter wave gas resonator and the heater dement to a sufficient extent to cause the liquid fuel to evaporate to maintain and enhance the size of the starter flame.

32. The pulse jet engine according to claim 29, wherein the quarter wave gas resonator is arranged to cause the starter flame to oscillate at high gain, whereby the resulting amplitude of the oscillation of the starter flame is sufficient to start the pulse jet engine.

33. The pulse jet engine according to claim 26, wherein the liquid fuel provides closure of the quarter wave gas resonator at the pressure antinode thereof.

34. The pulse jet engine according to claim 27, including a liquid fuel feed tube which is longer than the axial length of the quarter wave gas resonator which is channel-shaped.

35. The pulse jet engine according to claim 34, wherein the liquid fuel feed tube extends into the end of the quarter wave gas resonator remote from the gas pressure antinode thereof.

36. The pulse jet engine according to claim 1, including turbulator pins arranged perpendicularly to means to flow fuel and air to enhance mixing of fuel and air prior to entry into the quarter wave gas resonator.

37. The pulse jet engine according to claim 1, wherein at least the quarter wave gas resonator is made of a ceramic material.

38. The pulse jet engine according to claim 1, including an augmentor tube for accelerating bypass air to enhance aerodynamic efficiency of the pulse jet engine.

* * * * *